April 17, 1928.

D. M. REEVES

PRECISION ALTIMETER

Filed April 10, 1922

1,666,179

Inventor
D. M. Reeves

By Robert H Young Atty

Patented Apr. 17, 1928.

1,666,179

UNITED STATES PATENT OFFICE.

DACHE M. REEVES, OF LEE HALL, VIRGINIA.

PRECISION ALTIMETER.

Application filed April 10, 1922. Serial No. 551,348.

This invention relates to an altimeter capable of giving accurate readings.

A large proportion of errors in aneroid readings are due to two causes, namely, friction of the moving parts, and temperature changes. My invention obviates the former by eliminating all moving parts except the expansion and contraction of the cells and compensates for the latter by providing a combination of metals of different expansion coefficients.

The invention is hereinafter more fully described in connection with the accompanying drawings in which.

Figure 1:
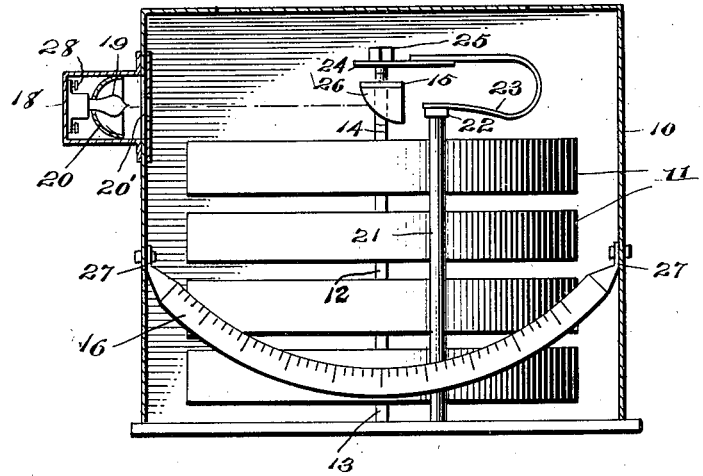
Figure 1 is a vertical cross section of an embodiment thereof.
Figure 2:
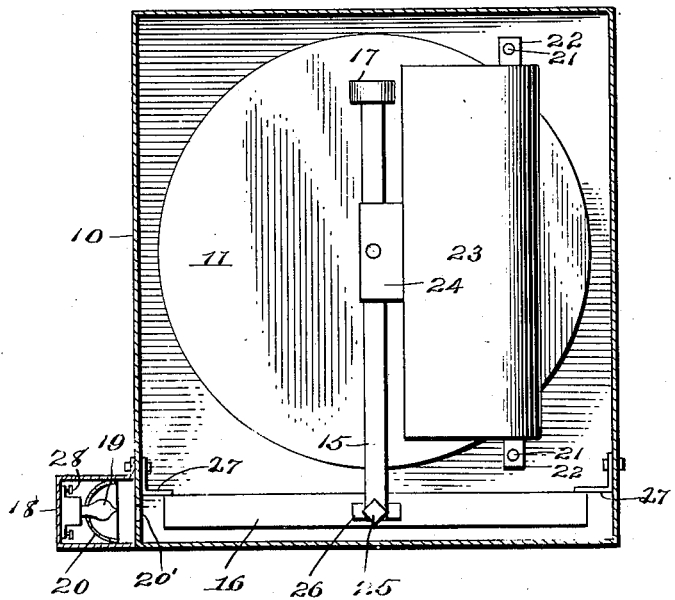
Figure 2 is a plan view.

The numeral 10 designates a casing having a bank of superposed cells 11 therein. These cells are arranged in spaced relation, the adjacent cells being connected together by posts 12 in such manner that the cumulative expansion or contraction of the cells is indicated by the position of the upper surface of the top cell above the base of the casing. A post 13 connects the lower surface of the bottom cell to the base of the casing and a pillar 14 secured to the central portion of the upper surface of the top cell has a flat rod 15 attached thereto.

The rod 15 carries at one end a mirror 26 having a curved reflecting surface, and at the other end a counterweight 17 for balancing the weight of the mirror. A box-like container 18 attached to a side of the casing has mounted therein an electric bulb 19 and a reflector 20 arranged so as to direct the light rays through an aperture 20' in the side wall of the casing toward the mirror 26. Posts 21 arranged at opposite sides of the cells 11 support a bar 22 in elevated position. A curved leaf spring is composed of a steel body 23 secured at one end to the bar 22 and having an extension 24 of brass attached thereto. The unequal expansion of these two metals will compensate for the weakening of the ordinary spring with heat. The extension 24 overlies the rod 15 and carries an adjusting screw 25 adapted to bear on said rod under the pressure of the leaf spring.

When the pressure of air outside the cells exceeds the pressure therein, the cells will contract and lower the position of the mirror while when the pressure within the cells is greater than the prevailing atmospheric pressure the cells expand and elevate the rod 15 and mirror in opposition to the leaf spring. The reflecting surface of the mirror is of such curvature that the beam of light from the bulb 20 is reflected downwardly at different angles depending upon the vertical position of the mirror. This beam is received on a curved scale 16 blackened and marked with a suitable scale and supported by angles 27 attached to the side walls of the casing.

As the cells expand and contract owing to differences in the relative pressures within and without the cells, the mirror 16 rises and falls and reflects a beam of light to corresponding positions on the scale 16, correctly graduated to give readings of altitude. While in exceptional cases it may be desired to have the light 19 active continuously, it is designed preferably to light only when a small switch (not shown) included in a circuit attached to the terminals 28 is closed. The idea is to use the regular altimeter of aircraft equipment for ordinary work, and only read the precision altimeter of this invention when accuracy is desired, as in setting bombing sights.

Any optical system which accomplishes the result of reflecting or refracting a beam of light so as to establish a relation as above described may be used in lieu of the electric bulb and curved mirror, and other changes may be made in the illustrated form of the invention without departing from the spirit and scope thereof as defined by the appended claims.

I claim:

1. An altimeter comprising an expansible means, a source of artificial light and means movable in a vertical path by said expansible means for deflecting a light ray at different angles in accordance with the degree of expansion and contraction of the expansible means.

2. An altimeter comprising an expansible cell, a source of artificial light and a deflector means for moving said deflector in a vertical path in accordance with the expansions and contractions of said cell, and a graduated scale to receive the light ray from said deflector.

3. An altimeter comprising an expansible cell, a light deflector carried thereby, a source of light, means for directing a beam of light from said source toward said deflector, a compensating spring acting on said deflector, and a scale to receive the light ray from said deflector.

4. An altimeter comprising an expansible cell, a mirror carried by said cell, means for directing a light beam toward said mirror, and a scale, said mirror having a surface of such contour as to reflect the light beam to said scale at different angles depending upon the degree of expansion of said cell.

In testimony whereof I have affixed my signature.

DACHE M. REEVES.